(12) United States Patent
Mishra

(10) Patent No.: US 11,121,859 B1
(45) Date of Patent: Sep. 14, 2021

(54) EFFICIENT INCREMENTAL CONSENSUS FOR BLOCK COMMIT IN BLOCKCHAIN NETWORK

(71) Applicant: Amazon Technologies, Inc., Seattle, WA (US)

(72) Inventor: Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 92 days.

(21) Appl. No.: 16/050,988

(22) Filed: Jul. 31, 2018

(51) Int. Cl.
*H04L 9/06* (2006.01)
*G06F 9/54* (2006.01)
*H04L 29/08* (2006.01)
*G06F 16/23* (2019.01)

(52) U.S. Cl.
CPC .......... *H04L 9/0637* (2013.01); *G06F 9/542* (2013.01); *G06F 16/235* (2019.01); *G06F 16/2379* (2019.01); *H04L 67/104* (2013.01); *H04L 2209/38* (2013.01)

(58) Field of Classification Search
CPC .......... G06Q 20/3678; G06Q 20/3823; G06Q 20/405; G06Q 30/0613; G06Q 10/06393; G06Q 20/023; G06Q 20/0457; G06Q 20/3224; G06Q 20/3274; H04L 67/1072; H04L 67/34; H04L 9/0637; G06F 3/0416; G06F 40/166; G06F 8/65

See application file for complete search history.

(56) References Cited

U.S. PATENT DOCUMENTS

2018/0039667 A1* 2/2018 Pierce ................. G06Q 40/04
2019/0165943 A1* 5/2019 Chari ................. H04L 9/3221

OTHER PUBLICATIONS

Antonopoulos, "Mastering Bitcoin", 2014, Oreilly, 1st edition, (Year: 2014).*

* cited by examiner

*Primary Examiner* — Johann Y Choo
(74) *Attorney, Agent, or Firm* — Knobbe, Martens, Olson & Bear, LLP

(57) ABSTRACT

Systems and techniques are disclosed for an efficient consensus protocol for block commits in a blockchain network. One of the methods includes obtaining, from a system, information indicating occurrence of a particular event, the particular event causing generation, by the entities, of respective block proposals for inclusions in the blockchain network. Attribution information is accessed, the information being generated including information describing the entities interactions with a user associated with the particular event. Incremental values are determined for inclusion in a block proposal associated with the entity. The block proposal is evaluated by remaining entities. The block proposal is included in the blockchain network based on greater than a threshold number of entities approving the block proposal.

16 Claims, 10 Drawing Sheets

EFFICIENT INCREMENTAL CONSENSUS FOR BLOCK COMMIT IN BLOCKCHAIN NETWORK

BACKGROUND

Blockchain networks are commonly used to securely store information, and to ensure that the information can be exactly replicated across any entity which can access the blockchain network. These networks help guard against improper tampering by any of the storing entities. For example, each block in the blockchain may include a cryptographic hash of a prior block and/or the entire blockchain. Thus, certain blockchain networks may be utilized to record transactions. Example blockchain networks may include Bitcoin, Ethereum, and so on. As new transactions are processed by the network, the transactions may thus be recorded in one or more blocks. To ensure that any entity (e.g., computer, server, mobile device) stores the same blocks—and therefore the same transactions—the entities may validate each new block proposed for inclusion in the blockchain. In this way, via validation the entities may arrive at a consensus regarding each new proposed block. Therefore, the validity of the transactions of the blockchain may be assured via the distribution of the blocks to each entity.

As is known, an example scheme to validate proposed blocks is via 'proof-of-work.' In this example scheme, the entities running the blockchain network (e.g., processing transactions) may perform complex cryptographic functions. As an example, a first user of the blockchain network may cause a transfer of certain cryptocurrency coins to a second user. In this example, the blockchain network may therefore issue the transfer as being a credit to a certain public key address associated with the second user. One or more entities may validate this transaction via traversing the previous blocks to ensure that a public key associated with the first user has access to the cryptocurrency coin amount being transferred. This transaction may therefore be included in a block proposed for inclusion in the blockchain (e.g., the transaction may be included in a memory pool of transactions). Additionally, one or more entities may perform cryptographic functions on the transactions included in the proposed block, until particular stopping criteria is met. Upon the particular stopping criteria being met, the proposed block may be validated and included in the blockchain. For example, the proposed block may include a cryptographic hash of a prior block and/or the entire blockchain. In this way, the blockchain may serve to record information in a distributed manner.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1A:
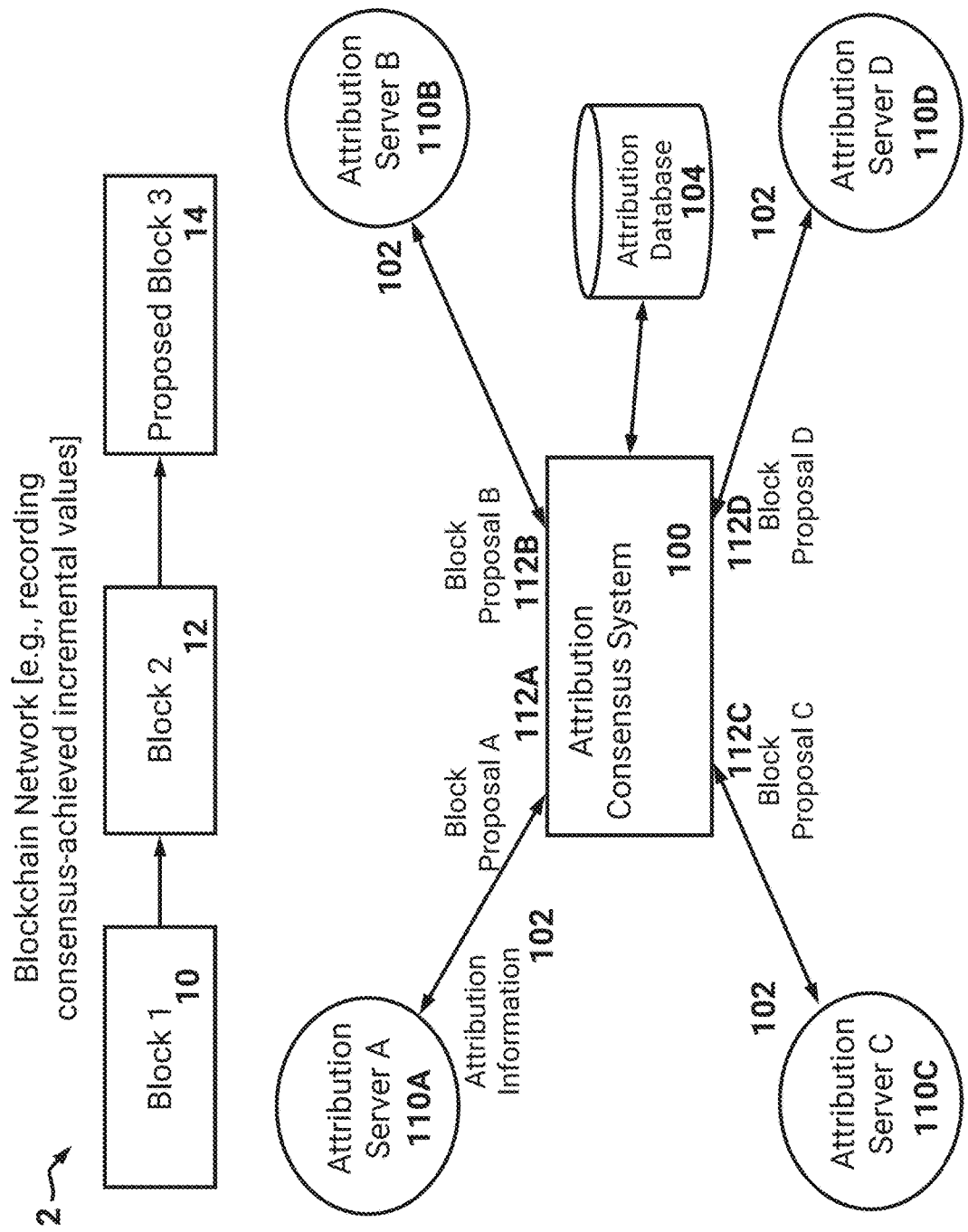
FIG. 1A illustrates an example block diagram of attribution servers proposing blocks for inclusion in a blockchain network.

Although particular embodiments are described herein, other embodiments, including embodiments that do not provide all of the benefits and features set forth herein, will be apparent to those of ordinary skill in the art.

Introduction

This specification describes a computing system that implements an improved blockchain consensus protocol (e.g., an incremental consensus protocol). As will be described in more detail below, a blockchain network may be utilized to store attribution information associated with a multitude of entities. For example, the entities may be different teams or groups within a corporation or other organization. Attribution information may represent measures of respective incremental benefits related to a particular event that are assignable to each entity. For example, the attribution information may represent a degree to which an entity caused (e.g., brought about) the particular event. These respective incremental benefits may be referred to herein as an incremental value. In the example described herein, the entities utilizing the blockchain network may each determine incremental values for all of the entities. As will be described, each entity may have access to the same information (e.g., from a trusted source) and therefore may differ in their determinations based on their respective schemes to determine incremental values. Each entity may then propose blocks for inclusion in the blockchain, and the entities may consent to one of the blocks being included. To ensure that each proposed block achieves consensus, the consensus protocol can allow for voting on, and negotiation of, the information to be included in the proposed block.

Due to the unique consensus protocol described herein, the blockchain network may advantageously be, at least, partially Byzantine tolerant. Thus, the consensus protocol improves upon other example consensus protocols. As is known in the art, Byzantine Fault Tolerance can represent the dependability of systems, such as where components may fail and there is imperfect information on whether a component is failed. In the context of blockchain networks, Byzantine Fault Tolerance can similarly represent a blockchain network handling transactions which may be faulty or inaccurate. As will be described, the consensus protocol may be a threshold Byzantine tolerant, such as ⅓ Byzantine tolerant. The consensus protocol may therefore efficiently handle situations in which the threshold (e.g., ⅓) number of entities can misbehave. For example, the threshold number of entities may propose unreasonable incremental values (e.g., not based on valid determination schemes using the accessed information).

In addition to the technical advantages described above, the system and techniques described herein can enable the rapid inclusions of consented-to incremental values into a blockchain. Thus, the blockchain may represent an unalterable version of incremental values agreed upon by entities. As an example, described herein, the incremental values may be generated in response to users performing specific actions with respect to computer systems. The different entities may each determine incremental values related to the performance of the specific actions. Since there may be thousands, hundreds of thousands, and so on, users performing these actions, the blockchain network described herein will need to quickly respond to proposed blocks.

Thus, a blockchain network provides technical advantages over other example technical implementations that enable consensus regarding incremental values. For example, while a server (e.g., storage subsystem) may be able to correlate amongst multitudes of entities for approval of incremental values, the server will be required to interface with each entity separately. In contrast, a blockchain network's proposed blocks may be immediately accessible by the entities in a distributed manner. Additionally, the server may be required to be trusted as the holder of such incremental values. In contrast, a blockchain network may cause each entity to store a same, verifiable, version of the incremental values in different blocks. Since one or more entities may be considered to be, at least partially, adversarial to each other, the distributed nature of the blockchain network can enhance the visibility into the consented to incremental values.

As a first example of utilizing the consensus protocol, a server provider may have disparate complex trained machine learning models and prefer understanding their effectiveness. It should be appreciated that a large technical hurdle related to effective machine learning models is access to training data sets. For example, with respect to machine learning models based on medical data (e.g., genomic data), accessing training data may be difficult due to privacy and access constraints. Thus, in the first example different entities may be associated with different training data sets which the server utilizes to train the machine learning models.

The server may analyze information, for example provided by users, and present information determined from the machine learning models. For example, with respect to images captured by a user, the server may generate labels (e.g., textual descriptions) describing the image scene. The server may receive information from a user indicating whether the generated label is correct. Since the machine learning models were trained using data sets generated by different entities, the server may have difficulty determining an extent to which each entity can be attributed a correct label.

Each training data set may optionally provide training data related to particular features. In the example of analyzing images, the training data sets may be related to specific image features. As an example, a training data set may include training data related to nature scenes (e.g., descriptions of nature images along with the nature images).

In the example of medical data, the training data sets may be related to specific medical ailments, specific types of genes, specific irregular mutations of genes, and so on. Thus, the different entities may determine incremental values associated with the entities. In this example, the incremental value can represent a benefit brought by an entity for a correct labeling by a machine learning model.

The server may provide, to each entity, information describing the training data sets provided by the entities. The different entities may therefore analyze the input to the machine learning models along with the labeled output. Through these analyses each entity may determine an extent to which all entities can be attributed the labeled output. With respect to images, each entity may identify an extent to which an image includes features that are associated with the training data sets. As will be described in more detail below, each entity may propose a block for inclusion in a blockchain, with the proposed block including their determined incremental values for all of the entities. Via the consensus protocol described herein, the entities may consent to a particular block being included in the blockchain.

As another example, the entities may be cloud server providers. These entities may be processing a same dataset via unique machine learning models. For example, a dataset may be uploaded by a user, and include images taken by the user. In this example, the images may include images of the user's family and friends. The cloud server providers may each analyze the dataset and assign relevant descriptors to the images (e.g., a name of a person in an image, descriptive language describing an image scene, and so on).

It should be appreciated that different machine learning models may have different effectiveness with respect to analyzing each image. For example, a first machine learning model may describe certain types of image scenes more accurately than a second machine learning model. Once each cloud server provider analyzes the same data set, the user may combine the results of the different analyses into an enhanced dataset. For example, the user may select a first machine learning model's analysis over a second machine learning model's analysis for an example picture. Optionally, the user may combine the different analyses for the example picture (e.g., the identifiers of imaged persons may be more accurate for the first model, and a description of the image scene may be more accurate for the second).

The different entities may then determine an incremental value that each entity provided. For example, an incremental value may be measured based on a degree to which an entity improved upon the dataset. These different entities may therefore determine an extent to which each entity should be attributed the final (e.g., enhanced) dataset. The extent may inform an effectiveness associated with each entity's machine learning model, and optionally each entity may receive a financial incentive for their incremental value.

In the above-described example, the different entities may therefore have a difficult time arriving at a consensus regarding the incremental value each entity provided. Indeed, the entities technique to determine their respective incremental value may be distinct. Thus, even if the entities are attempting to fairly determine attribution, the determined incremental values may be distinct.

As another example of entities determining attribution, a multitude of entities may cause, or otherwise be associated with, content presented on user devices of a user. For example, a first entity may cause particular content to be included in a web page visited by the user (e.g., advertisements). As another example, a second entity may provide content, such as emails, to an inbox of the user. As another example, a third entity may monitor particular user interactions of the user (e.g., search queries provided by the user, social network interactions, and so on). In this example, the third entity may determine information usable (e.g., by other entities) to provide content to the user. The user may ultimately perform a particular action related to the content being presented to him/her. For example, the user may download a particular software suite. As another example, the user may purchase a particular item.

In the above-described example, the different entities may determine attribution information related to the user performing the particular action. For example, the entities may each determine an incremental value assignable to each entity. As in the example problems described above, it may be difficult to determine incremental values that are assignable to each entity. As an example, the user may have been planning on downloading the particular software suite without being presented content. Thus, the content presented by the first entity to the user may have had little actual effect. However, given that the entities may have limited information as to the user's reasons for downloading the software suite, the entities may determine incremental values according to their preferred schemes. Example schemes may include last touch, equal credit, linear multi-touch, weighted multi-touch, statistical or machine learning algorithms, and so on.

As will be described below, the different entities may utilize the consensus protocol described herein to record incremental values. Since each entity may be providing, or otherwise be associated with, content presented to hundreds of thousands of users, determining attribution information may become unwieldly without a scheme to quickly determine and record the attribution information. Thus, as will be described below the different entities may utilize a blockchain network to rapidly store incremental values related to each occurrence of one of the particular actions (e.g., downloading a software suite, purchasing a product, and so on).

Overview

As will be described below, a unique consensus protocol may be utilized to determine incremental values agreeable to at least a threshold percentage of entities that are included in the blockchain network (e.g., execute software that enables functioning as nodes involved in the blockchain network). Example thresholds may include ½, ⅗, ⅔, and so on. As utilized herein, an incremental value represents a measure of attribution related to a specific action which can be solely attributed to an entity. For example, a specific action may be a user creating a user account via a web page. The entities may each have provided content to the user attempting to persuade the user to create a user account. Thus, an incremental value may represent an extent to which an entity caused the user to create the user account (e.g., nudged the user towards creating the user account).

To record incremental values, a blockchain network may be utilized. Advantageously, the blockchain network may rely upon the consensus protocol to maintain the replicability of the blockchain network. It should be appreciated that particular blockchain networks may utilize consensus protocols based on proof-of-work. While these protocols may help safeguard against improper tampering of information recorded in the blockchain, they are known to waste considerable processing power and electricity. Additional blockchain networks may utilize proof-of-stake consensus protocols. These protocols may suffer from certain attacks related to entities proposing multiple blocks for inclusion in the blockchain.

In contrast, the consensus protocol described herein enables each entity to propose a block for inclusion in the blockchain. Each proposed block may include incremental values determined by an entity for all entities in the blockchain network. Optionally, each proposed block may include incremental values for a threshold number of entities in the blockchain network. As will be described, each entity may have access to the same information (e.g., received from a system, such as the attribution consensus system 100 described below). This system may monitor user interactions with different content servers, and may obtain information indicating performance of a particular action (e.g., signing up for a user account, downloading a software product, purchasing a product, and so on). Thus, each entity can determine incremental values using the same information but according to their preferred schemes.

A first proposed block may be selected for consideration, for example an entity may be selected according to different techniques. As an example, a selected entity may be associated with significant traffic (e.g., the selected entity may present content to greater than a threshold number or percentage of users). The entities may then perform a prevoting step to vote on whether the proposed block is to be accepted into the blockchain. For example, the entities may determine a variance between the incremental values in the proposed block and their own determined incremental values. If a threshold percentage of entities vote to include the proposed block, the proposed block will be included in the blockchain. Inclusion in the blockchain may include at least a threshold number of entities causing their blockchain to reference the proposed block. For example, the proposed block may be added to the chain, and include one or more of a reference to a prior block, a cryptographic hash associated with the prior block, or a cryptographic hash associated with the blockchain. While other entities may generate their own forks of the blockchain, these would not form a majority and would therefore not be considered as a valid representation of the blockchain.

If the threshold percentage of entities does not vote to include the proposed block, the entities may perform the prevoting step on a proposed block from a next entity. The voting can continue to subsequent entities' proposed blocks until a proposed block obtains greater than the threshold percentage of votes. However, if no proposed block is successfully included in the blockchain, a threshold number of proposed blocks (e.g., proposed blocks which received the most votes) may be voted on again. The remaining proposed blocks may then be discarded. For example, the threshold number may be the top 3, 4, 7, proposed blocks. Similar to the above, if no proposed block obtains the threshold percentage of votes, the number of proposed blocks may be reduced again until a proposed block successfully obtains the threshold percentage of votes. Thus, the consensus protocol described herein may be Byzantine Fault Tolerant. For example, if the threshold percentage of votes is ⅔, then the consensus protocol may be ⅓ Byzantine Fault Tolerant.

It should be understood that the entities, such as server systems, may automatically determine incremental values according to received information, for example without user interaction. Additionally, the voting described above may be similarly performed by the entities without user interaction. As an example, the entities may vote based on a difference between their own incremental values and incremental values included in a proposed block, as determined automatically by a computing system. Optionally, the entities may utilize machine learning techniques to rapidly indicate whether to affirmatively or negatively vote. The voting described herein may optionally represent entities precommitting a proposed block, and broadcasting these precommits onto the blockchain network. For example, an entity may vote via providing a message for broadcast to the other entities indicating acceptance of the proposed block.

Optionally, for a proposed block that achieves at least the threshold percentage of votes, the entities may refine the incremental values in the proposed block. As an example, an entity may indicate that a first incremental value (e.g., assigned to a first entity) should be reduced while a second incremental value (e.g., assigned to a second entity) should be increased. The refinement may be limited to adjusting one or more incremental values by less than a threshold percentage. Thus, the entities may be limited in their proposal of refinements. Optionally, the refinement step may be performed upon greater than a threshold percentage of entities voting to refine the proposed block.

Thus, the consensus protocol described herein improves upon prior consensus protocols via an automatic distributed negotiation process. In contrast to prior consensus protocols, the entities involved in a blockchain network can determine whether to include a proposed block into the blockchain. In this way, the values included in each proposed block may be agreeable to at least a threshold percentage of the entities associated with the blockchain network. Thus, the techniques described herein can rapidly serve any set of automated entity which may be required to quickly come to consensus regarding information.

Example Block Diagrams

FIG. 1A illustrates an example block diagram of attribution servers 110A-110D proposing blocks for inclusion in a blockchain network 2. For example, the blockchain network 2 is illustrated as including block 1, followed by block 2, with block 3 being proposed by the attribution servers 110A-110D (e.g., systems of one or more computers). The attribution servers 110A-110D may represent entities involved in the blockchain network, and may thus be nodes of the blockchain network. For example, a node may store the blockchain and may execute software associated with participating in the blockchain network. The executed software may, as an example, enable messages (e.g., signed messages) to be broadcast on the network, enable sharing of proposed blocks for inclusion in the blockchain, and so on. Additionally, each attribution server may be preconfigured or preprogrammed by its respective entity with a set of rules that govern its voting behavior, such that each attribution server can act as an automated agent for its respective entity.

An attribution consensus system 100 is illustrated as providing attribution information 102 to each attribution server. The attribution consensus system 100 may be a system of one or more computers, a system of one or more virtual machines executing on a system of one or more computers, and so on. Additionally, the attribution consensus system 100 may execute a node of the blockchain network. As will be described, attribution information 102 may relate to a particular action or trigger that causes a proposed block 14 to be generated. The particular action may relate to a user conversion. For example, the particular action may represent a user selecting a particular product for purchase via an electronic marketplace. As another example, the particular action may represent a user creating a user account. As another example, the particular action may relate to final characterizations of an image via different machine learning models.

To trigger generation of the proposed block 14, the attribution consensus system 100 may provide information to the blockchain network 2 indicating occurrence of the particular action described above. As an example, the attribution consensus system 100 may execute particular software (e.g., trusted code), which can interact with the blockchain network 2. The particular software may represent an oracle and the attribution consensus system 100 may communicate with a smart contract associated with the blockchain network 2. The smart contract may receive information from the attribution consensus system 100, and evaluate the information to cause triggering of proposed blocks. The received information may indicate occurrence of the particular action, and the smart contract may confirm the validity of the information. For example, the system 100 may sign the message, such as via public key/private key encryption. Upon validation of the received information, the smart contract may cause information to be provided to the attribution servers 110A-110D causing generation of block proposals 112A-112D.

The attribution servers 110A-110D may obtain the attribution information 102 from the attribution consensus system 100. As will be described, the servers may then determine incremental values for inclusion in respective block proposals 112A-112D. Optionally, the smart contract described above may receive information indicating one or more identifiers associated with the attribution information 102 from the attribution consensus system 100. In this way, the attribution servers 110A-110D may provide a request (e.g., a network request) to the attribution consensus system 100 for the attribution information 102 based on the identifiers. Optionally, the smart contract may cause the attribution information 102 to be routed to the attribution servers 110A-100D. For example, upon validating that a new block 14 is to be triggered for inclusion in the blockchain network 2, the smart contract can cause specific attribution information 102 to be routed to the servers 110A-110D.

The description above described utilization of smart contracts to cause generation of a new block 14. Optionally, the attribution consensus system 100 may identify that a new block 14 is to be generated (e.g., based on a user purchasing a product), and provide information directly to the attribution servers 110A-110D. The information may cause the attribution servers 110A-110D to generate block proposals 112A-112D. The attribution consensus system 100 may similarly provide access to the attribution information 102. For example, the attribution information 102 may be requested via one or more network calls provided by the attribution servers 110A-110D.

The attribution information 102 may include information sufficient for each attribution server to determine incremental values assignable to itself and all other attribution servers 110A-110D. An example of attribution information 102 follows; however, it should be understood that attribution information 102 may include other types of information. With respect to the above-described example of a user selecting a particular product for purchase from an electronic marketplace, the attribution information 102 may represent all ingresses by the user that are associated with the electronic marketplace. For example, the attribution information 102 can include any information received by the electronic marketplace that is associated with a journey taken by the user to the end point of purchasing the product. As an example, an ingress may represent transits to the electronic marketplace, cookies that provide information to the electronic marketplace, clickstream or nexus data, and so on. Described below are further details related to attribution information 102 for this example, however it should be understood that other examples may relate to different situations (e.g., automated machine learning systems, and so on).

The attribution information 102 of FIG. 1 may represent content items (e.g., advertisements) presented to a user. These content items may be served by, or otherwise associated with, one of the attribution servers 110A-110D. Additionally, the attribution information 102 may represent any interactions with the attribution consensus system 100, or any interactions with, or detectable by, one of the attribution servers 110A-110D. As an example, the attribution information 102 may indicate that one or more content items related to a search query entered by the user were presented to the user (e.g., at a particular time). The attribution information 102 may further indicate that a user visited a web page related to certain content. In this example, an attribution server may have served the web page to the user (e.g., a blog post related to certain products, such as a recommendation web page). A cookie on a web browser utilized by the user may have recorded the user visiting the web page. For example, the cookie may provide information to the attribution consensus system 100, or the attribution server may have provided information to system 100. As another example, the attribution information 102 may indicate that a user clicked on a certain content item related to particular content (e.g., the user clicked on a presented advertisement). Attribution information 102 may indicate that the user navigated to an electronic marketplace, and was presented particular recommended content (e.g., recommended products). In this example, the user interactions may be recorded, such as the user selecting a particular recommended product for purchase. Optionally, the attribution consensus system 100 may be associated with an electronic marketplace, and may therefore obtain information indicating when purchases are performed.

Attribution information 102 may therefore relate to a specific action that triggers generation of a proposed block 14. In the example above, the attribution information 102 may describe all information obtained by the attribution consensus system 100 that relates to a user purchasing a product. Thus, if a particular content item associated with a product (e.g., a blender) is presented to the user, and the user later purchases a blender, the attribution information 100 can include information identifying this journey. Attribution information 102 may thus describe a user's click history on one or more web pages, for example on an electronic marketplace.

As an example, a user may select running shorts as a product to be purchased. In this example, the attribution information 102 may indicate that the user viewed a web page (e.g., a blog post) related to running. For example, the web page may provide reviews of running shoes. The attribution consensus server 102 may receive information identifying this viewing of the web page through a cookie utilized by the web page, or information receive from a server hosting the web page. Optionally, a tool bar installed on a browser of the user's user device may monitor the user's interactions and provide data to the system 100 indicating browsing habits (e.g., anonymized data). The tool bar can provide browsing history data, click data, user interactions made on web pages, verbal or audio input, and so on. In this example, the web page may be associated with an attribution server and may determine that it caused, at least in part, the conversion of the user to purchasing the running shorts. For example, this determination may be referred to as a halo effect. Thus, the attribution server may determine that its incremental value is non-zero.

The attribution consensus system 100 may additionally generate behavior information for inclusion in the attribution information 102, which may be based on one or more machine learning models. The behavior information can include information representative of a user journey towards a specific action (e.g., purchasing a product), and may reference event timestamps indicating when particular events occurred. For example, the system 100 may determine that users who purchase particular types of products (e.g., certain home product, technology products) may generally utilize a specific web page that provides reviews. If the attribution information 102 does not include any indication that the user actually visited the specific web page, the behavior information may determine a likelihood that the user visited the specific web page. For example, the user may have visited the specific web page on a different device not known to be associated with the user. Thus, even though the attribution information 102 does not reflect actual access, the behavior information may indicate otherwise. To determine the likelihood, the system 100 may obtain information indicating a browsing history of the user (e.g., whether the user has visited the specific web page, for example within a threshold period of time), whether the user visited the specific web page and clicked on a link that directed to an electronic marketplace associated with the system 100, and so on. Thus, the attribution information 102 may include information generated by the system 100 which the attribution servers 110A-110D may optionally utilize to determine incremental values. In this way, the attribution servers 110A-110D may determine that an attribution server associated with the specific web page may have a non-zero incremental value.

Optionally, the attribution information 102 may include information only from within a threshold period of time. For example, the information 102 may indicate content items presented to the user within the threshold period of time (e.g., 7 days, 14, days 23 days, and so on). Optionally, this threshold period of time may be adjusted by the attribution servers 110A-110D upon a threshold percentage of the servers 110A-110D agreeing to the change (e.g., 50%, 66%, and so on). Additionally, the threshold period of time may depend on a particular type of product that was purchased. For example, purchasing a high value product like high-end audio equipment may have a longer period of time than purchasing a tooth brush.

In all situations in which user information is stored, for example in attribution information 102, the information can be anonymized such that the attribution servers 110A-110D are unable to determine personal, or otherwise sensitive, information. For example, the attribution information 102 may reference a user according to a unique identifier that is not associated with personal information of the user, such as identifying information. As another example, the attribution information 102 may remove specific web pages visited by the user or content items seen by the user. Rather, the information 102 may indicate times at which the user received particular content, which attribution server is associated with the particular content, and so on. In this way, user privacy may be maintained.

The attribution consensus system 100 can thus gather attribution information 102 related to multitudes of different events that cause new block proposals to be triggered. Example events, as described above, may include a user purchasing a product, a machine learning model classifying images or medical data, and so on. The attribution consensus system 100 can receive portions of the attribution information 102 from different entities that monitor user interactions with content servers (e.g., web servers), monitor content being presented to users, and so on. Additionally, and as described above, the attribution information 102 may reflect all information related to ingresses of a user to the system 100. For example, cookies, user interaction data, toolbar information, and so on may route information to the system 100. The attribution information 102 may therefore be stored in an attribution database 104, which may represent a storage subsystem accessible over one or more networks to the system 100.

The attribution consensus system 100 may select particular attribution servers 110A-110D based on the attribution information 102. For example, the system 100 may gather attribution information 102 and store the information 102 (e.g., in accessible records). The system 100 may then select attribution servers 110A-110D that are implicated in the attribution information 102. As an example, the system 100 may select servers 110A-110D which were associated with at least one interaction with the user, or associated with at least a threshold number of interactions with the user. An example interaction may include presenting content to the user. Therefore, only relevant attribution servers 110A-110D may receive the attribution information 102 related to a user action (e.g., purchasing a product). In this way, these attribution servers 110A-110D will be authorized to propose blocks for inclusion in the blockchain.

Thus, each attribution server may obtain the attribution information 102 and determine incremental values for all the attribution servers 110A-110D. Optionally, the attribution consensus server 110 may provide a value indicating the total incremental value available for distribution between the attribution servers 110A-110D. With respect to the example of purchasing a product, the system 100 may indicate that only a portion of the purchase price can be attributed to the attribution servers 110A-110D. Thus, this portion may be available for distribution, and the attribution servers 110A-110D can each determine proposed proportions.

As illustrated in FIG. 1, the attribution servers 110A-110D propose blocks for inclusion in the blockchain network 2. For example, block proposals 112A-112D are illustrated. Optionally, these block proposals 112A-112D may be provided to the attribution consensus system 100. The system 100 may then route the block proposals 112A-112D to each attribution server. Each block proposal can indicate an incremental value for all of the attribution servers 110A-110D. As will be described below, the attribution servers 110A-110D can come to consensus regarding the incremental values. Upon consensus a proposed block 14 will be included in the blockchain network 2.

Figure 1B:
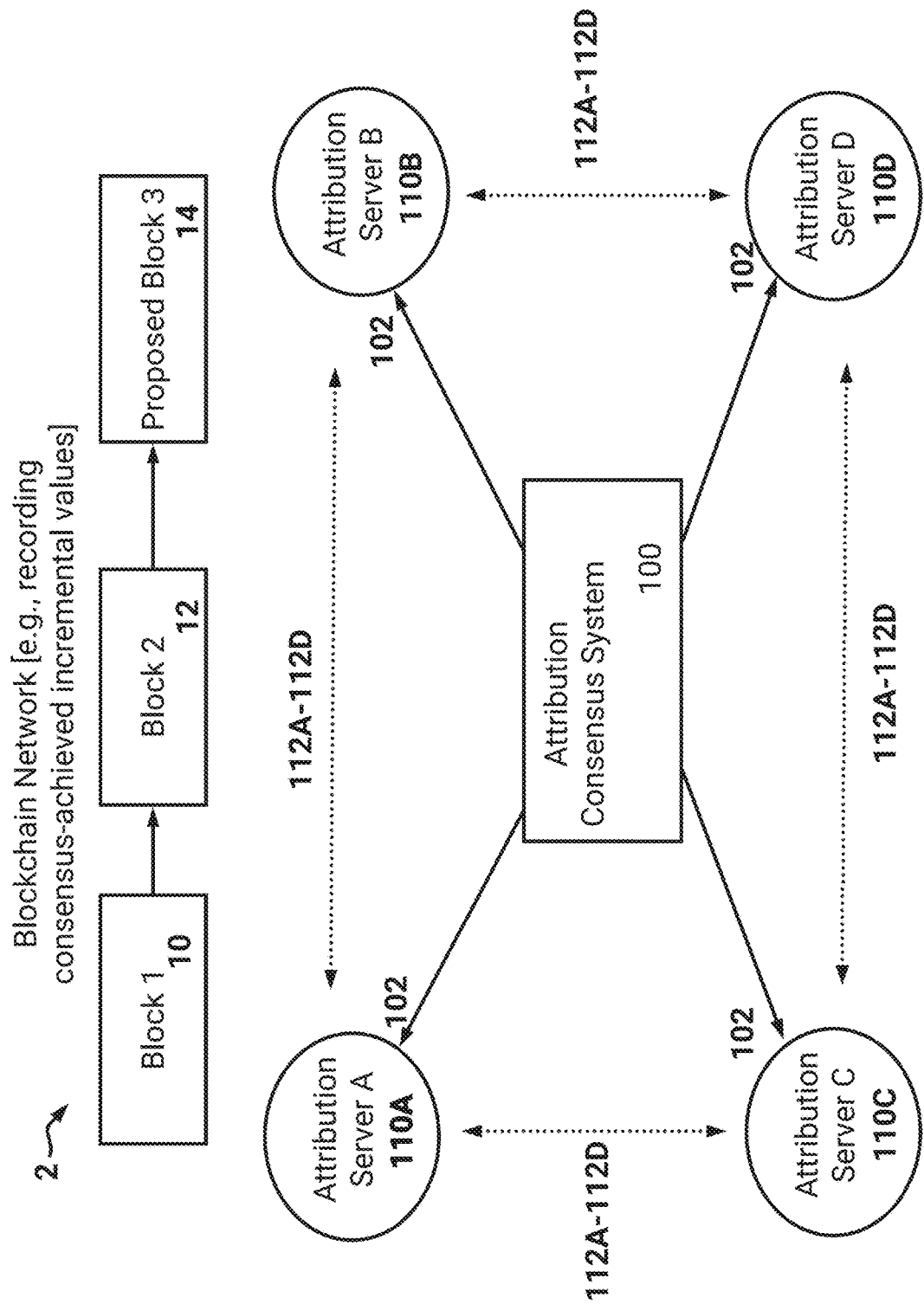
FIG. 1B illustrates another example block diagram of attribution servers proposing blocks for inclusion in a blockchain network.

FIG. 1B illustrates another example block diagram of attribution servers 110A-110D proposing blocks for inclusion in a blockchain. As illustrated, each attribution server receives attribution information 102, and determines incremental values for inclusion in proposed blocks. Each attribution server then provides its block proposal to the remaining attribution servers. For example, the attribution servers 110A-110D can broadcast their proposed blocks 112A-112D for evaluation by the attribution servers 110A-110D.

As an example, an attribution server 110A may determine incremental values for itself and all of the remaining servers 110B-110D. As described above, the determination may be based on last touch, equal credit, linear multi-touch, weighted multi-touch, statistical or machine learning algorithms, and so on. The attribution server 110A may generate a proposed block that includes, at least, the determined incremental values. To broadcast the proposed block, the attribution server 110A can utilize an application, or other software, executing on the attribution server 110A.

For example, the attribution server 110A can function as a node of the blockchain network 2. In this example, the attribution server 110A can transmit its proposed block 112A to one or more peers (e.g., via TCP over the internet). The server 110A may connect to a threshold number of peers (e.g., other attribution servers), and the peers may relay the proposed block 112A to respective peers (e.g., other attribution servers). In this way, the proposed block 112A may be routed to all attribution servers 110B-110D. Optionally, the attribution server 110A may directly provide the proposed block 112A to the attribution servers 110B-110D.

As will be described in more detail below, the attribution servers 110A-110D may evaluate the block proposals 112A-112D incrementally. A particular attribution server's (e.g., server 110A) block proposal may be evaluated by the attribution servers 110A-110D first. As an example, the particular attribution server may be randomly selected from among the attribution servers 110A-110D, or may satisfy one or more starting criteria. Example starting criteria may include the particular attribution server having greater than a threshold network activity with respect to the specific event triggering block proposals. In this example, the network activity may be associated with presentation of content items via web pages visited by users. Additionally, the network activity may be associated with monitoring user browsing habits (e.g., cookies). Thus, the particular attribution server may be selected based on a measure of importance with respect to the other attribution servers or based on a measure of insight into user behavior.

In this way, the selected attribution sever may be assumed to determine reasonable incremental values since it may have the greatest insights into user behavior. For example, the selected attribution server may best have information indicating reasons for which users purchase items and a degree to which presentation of content items, reading blog posts, and so on may affect those reasons. As will be described, the selected attribution server may be selected from a threshold number of attribution servers that also have high network activity (e.g., greater than a threshold percentage of network activity). Therefore, the attribution server selected to have its block proposal considered first may vary between block proposals.

Figure 2A:
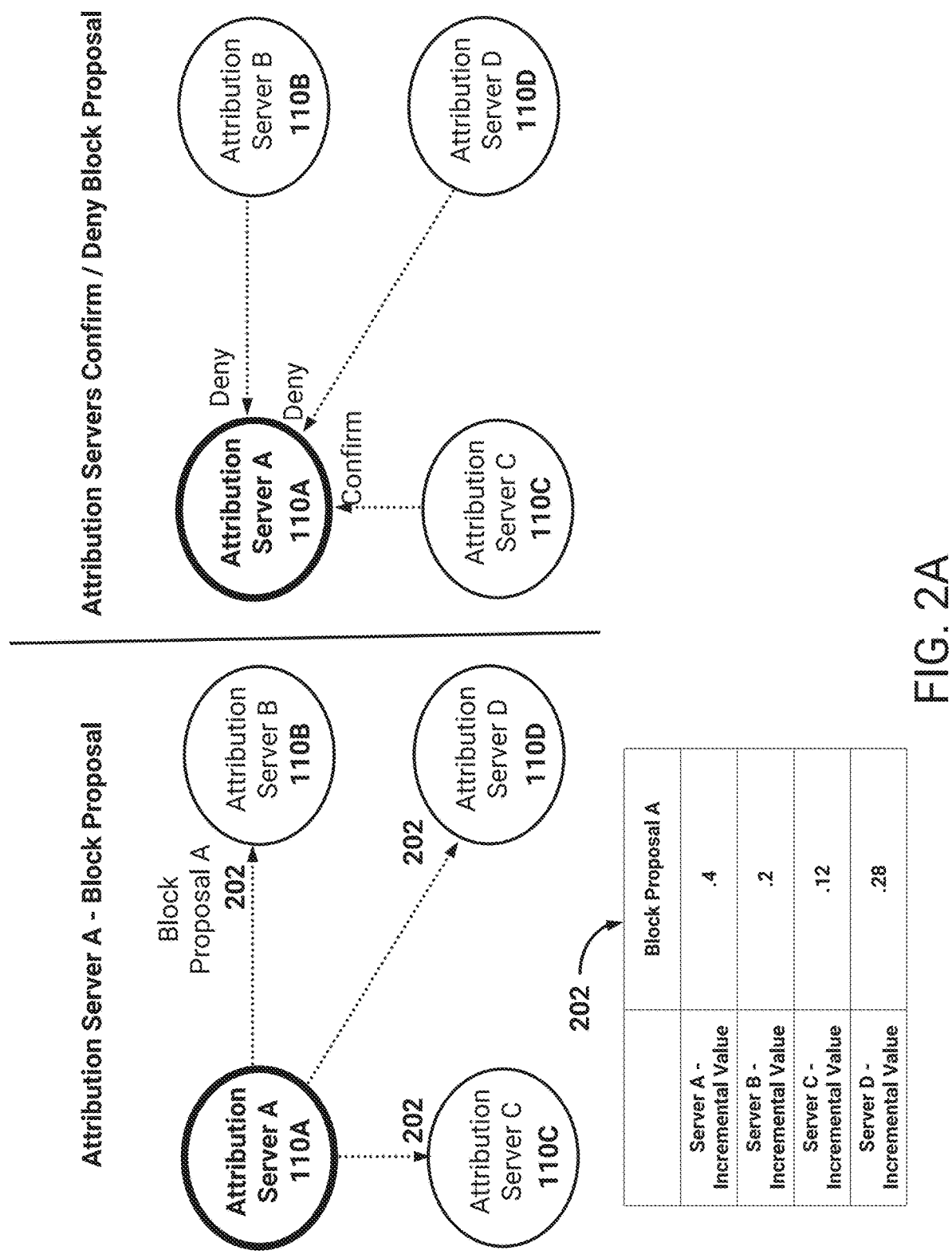
FIG. 2A illustrates a block diagram of attribution servers evaluating a block proposal according to the consensus protocol described herein.

FIG. 2A illustrates a block diagram of attribution servers 110A-110D evaluating a block proposal 202 according to the consensus protocol described herein. As described above, with respect to FIGS. 1A-1B, block proposals may be triggered based on a particular action being taken (e.g., by a user). The attribution servers 110A-110D may then obtain attribution information 102 and determine incremental values assignable to all attribution servers 110A-110D. As an example, an incremental value can be measured as a benefit attributed to a particular attribution server related to the occurrence of the particular action.

As illustrated in FIG. 2A, attribution server A 110A is illustrated as providing its block proposal 202 to the remaining attribution servers 110B-110D for evaluation. An example of incremental values included the block proposal 202 is illustrated. As described above, the attribution servers 110A-110D can obtain information indicating a total incremental value that can be distributed amongst the servers 110A-110D. Thus, the incremental values included in the block proposal 202 may sum to the total incremental value. Optionally, the attribution servers 110A-110D may assume that the total incremental value is 1, and distribute incremental values as being portions of 1. In this example, the attribution consensus system 100 can multiply the distributed incremental values by the actual total incremental value. The attribution consensus system 100 can then distribute the incremental values to the attribution servers 110A-110D (e.g., provide a monetary benefit based on the distributed incremental values).

Attribution server A 110A may be selected to provide the first block proposal for evaluation based on its network activity (e.g., as described in FIGS. 1A-1B). The attribution consensus system 100 may optionally select the server A 110A based on the attribution information 102. For example, the attribution consensus system 100 may analyze the attribution information 102 for an indication of which attribution server appears to have presented most content to a user, or which attribution server appears to have affected a user's journey the greatest. As another example, the attribution server which last "touched" the user (e.g., last interacted with the user, such as via a content item), or which first touched the user, may be selected. In this example, the attribution consensus system 100 may indicate that a particular attribution server is to initially provide a block proposal. For example, the system 100 may provide information to the smart contract described above (e.g., via an oracle). As another example, the blockchain network 2 may indicate which attribution server is to be selected first. For example, each attribution server may execute an application, or other software, that enables the attribution servers to function as nodes of the blockchain network. The application may thus select (e.g., randomly) a particular attribution server from amongst the attribution servers or a subset of the attribution servers. Additionally, the application may cause the attribution server with greatest network activity to be selected, or the attribution server which last or first touched the user.

Optionally, any attribution server may propose its block proposal for initial evaluation. For example, upon receipt of information triggering block proposals, any attribution server may broadcast its block proposal for evaluation. As described above, a particular attribution server may be selected to have its block proposal evaluated first. The attribution servers may therefore indicate which block proposal is to be evaluated first. For example, the servers may determine to evaluate a block proposal associated with an attribution server which has the greatest incremental values (e.g., a median greatest incremental value based on the block proposals). As another example, the servers may determine to evaluate a block proposal from an attribution server with greatest network activity, or from an attribution server which first or last touched the user (e.g., interacted with the user). As described below, each attribution server may utilize one or more machine learning models to evaluate block proposals. These machine learning models may advantageously learn over time to increase their accuracy and effectiveness with respect to determining incremental values. Optionally, particular attribution servers may more reliably determine incremental values than other attribution servers. For example, these servers may determine incremental values that are selected for inclusion in the blockchain via the consensus protocol described herein. As another example, these servers may determine incremental values that are generally within one or more thresholds of the incremental values selected for inclusion in the blockchain. Thus, these attribution servers may be selected to have their block proposals generally evaluated first.

Upon receipt of the block proposal 202, the attribution servers 110B-110D may evaluate the incremental values. For example, the attribution servers 110B-110D can compare the incremental values to their own determined incremental values. Since the attribution servers 110A-110D may compute incremental values according to their own schemes, the incremental values may differ even though the servers 110A-110D all have the same information (e.g., the attribution information 102). Similarly, the attribution servers 110B-110D may evaluate the block proposal 202 according to their own schemes. For example, the servers 110B-110D may utilize machine learning techniques. Additionally, and as will be described, the servers 110B-110D may optionally cause refinement to the incremental values in the block proposal 202. Thus, an attribution server may prefer accepting the block proposal so that it may be refined. In contrast, if the attribution server does not accept, the subsequent block proposal to be analyzed may be less satisfactory (e.g., their incremental value may be less). In this way, machine learning techniques may be relied upon to rapidly respond to the block proposal 202. Optionally, respective users of the attribution servers 110B-110D may provide user input confirming or denying the block proposal 202.

As illustrated in FIG. 2A, attribution servers 110B and 110D have denied the block proposal 202 while attribution server 110A has consented to the block proposal 202. Thus, the blockchain network 2 may reject the block proposal 202. For example, the number of consents may be required to reach greater than a threshold percentage of the attribution servers 110A-110D (e.g., $\frac{2}{3}$, $\frac{3}{4}$). The attribution servers 110A-110D may provide messages via the blockchain network 2 indicating their consent or denial, and applications, or other software, may cause the block proposal 2 to be indicated as invalid. Thus, the block proposal 2 will be discarded for inclusion in the blockchain network 2.

As will be described in more detail below, a subsequent block proposal may be evaluated by the attribution servers 110A-110D. If no block proposal is accepted (e.g., by greater than a threshold percentage of the attribution servers), then the consensus protocol may cause the top threshold number of block proposals to re-evaluated again. For example, the consensus protocol may cause selection of a top 2, 3, 5, 27, and so on, block proposals according to a number of respective votes each block proposal received. The consensus protocol may continue causing attribution servers to evaluate the block proposals until a particular block proposal is accepted. As will be described below, the accepted block proposal may optionally be refined by the attribution servers. For example, the incremental values included in the accepted block proposal may be adjusted upwards or downwards (e.g., within a threshold percentage of their initial value).

Figure 2B:
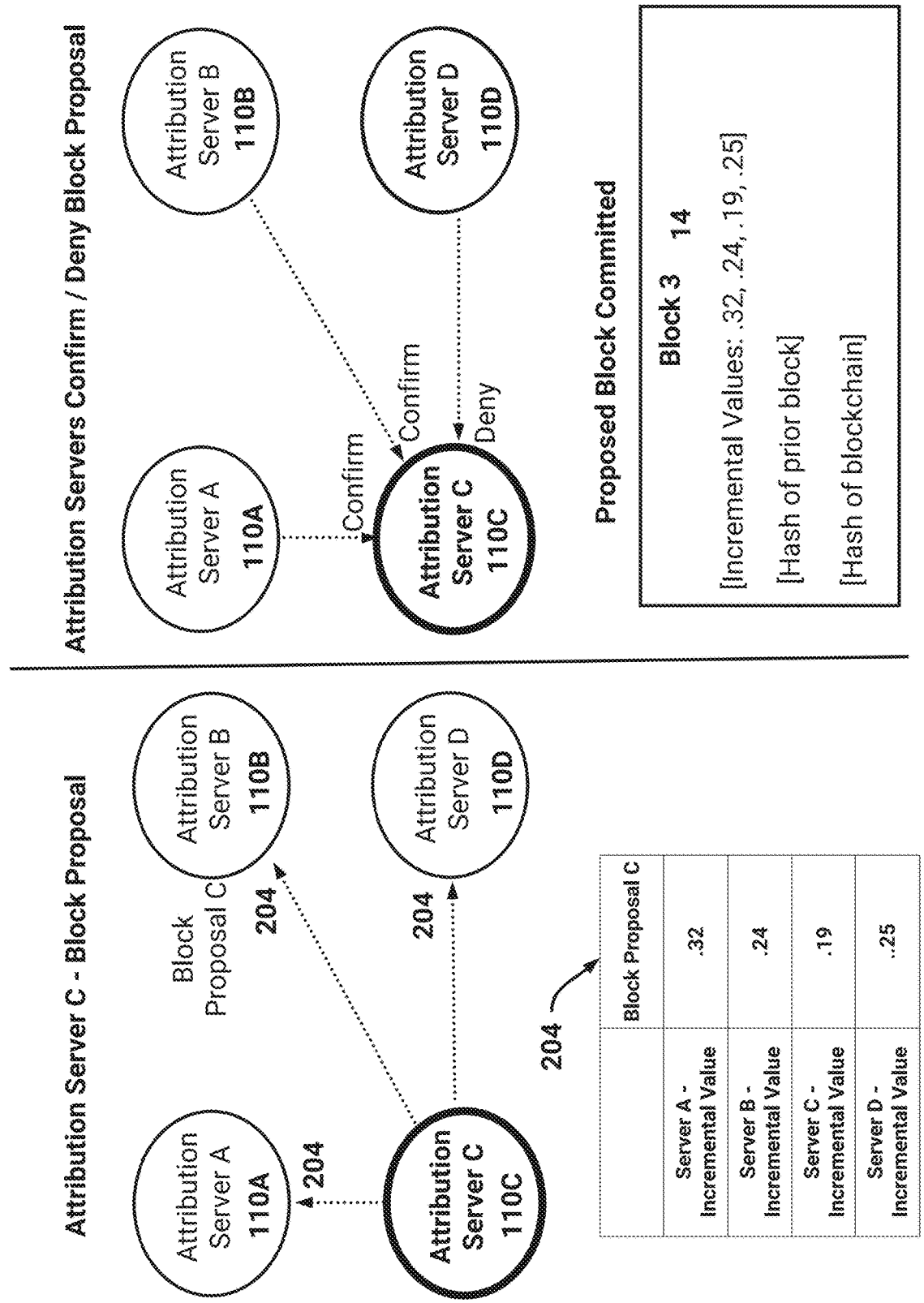
FIG. 2B illustrates a block diagram of attribution servers evaluating another block proposal according to the consensus protocol described herein.

FIG. 2B illustrates a block diagram of attribution servers 110A-110D evaluating another block proposal 204 according to the consensus protocol described herein. Upon rejection of the initial block proposal 202, a next attribution server 110C may be selected to provide a block proposal 204. Optionally, the attribution server 110C may be selected randomly from amongst all of the attribution servers. Optionally, the attribution server 110C may represent an attribution server that is the next most represented in the attribution information 102. For example, the attribution information 102 may indicate that attribution server 110C provided a next greatest number of content items to a user.

An example block proposal 204 is illustrated in FIG. 2B, and includes incremental values determined by the attribution server 110C. As indicated in the block proposal 204, the attribution server 110C has increased its assigned incremental value (e.g., from 0.12 in proposal 202 to 0.19 in proposal 204). Similar to the above, the attribution server 110C can cause its block proposal 204 to be routed to the attribution servers 110A, 110B, 110D for evaluation.

In the example of FIG. 2B, attribution servers 110A-110B have consented to the block proposal 204 while attribution server 110C has rejected the block proposal 204. Thus, ⅔ of the remaining attribution servers 110A, 110B, 110D have consented to the block proposal 204. Additionally, ¾ of the attribution servers 110A-110D have consented to the block proposal 204. The percentage of attribution servers (e.g., either attribution servers not including attribution server 110C, or all attribution servers) may be compared to a threshold, such as ⅔, ¾, and so on. In this example, the proposed block 204 has been committed to the blockchain network 2.

Block 3 14 is illustrated in FIG. 2B, and indicates the incremental values specified in block proposal 204. Optionally, additional attribution information 102 may be included, such as incremental OPS, incremental CCP, incremental probability of clicks, and so on. This information may be hashed (e.g., cryptographically hashed) and stored in the block 3 14. Additionally, the block 3 14 can include references to one or more of (1) a prior block in the blockchain network 2 (e.g., a cryptographic hash) and (2) the blockchain network 2 (e.g., cryptographic hash of the network 2). Thus, the blockchain network 2 may optionally represent a Merkle tree such that the blockchain network 2 may be preserved. The attribution servers 110A-110D may thus include block 3 14 in their respective blockchain nodes.

As will be described in FIGS. 3A-3C, a block proposal may be refined by the attribution servers 110A-110D. For example, if block proposal 204 did not achieve the threshold percentage of consents, the attribution servers 110A-110D may vote to cause refinement of the block proposal 204. In this way, if the attribution servers 110A-110D indicate the block proposal 204 is close enough to be considered for refinement, the block proposal 204 may be refined amongst the servers 110A-110D. The attribution servers 110A-110D may then perform a vote on the refinements, and the refined block can be included in the blockchain network 2 based on the threshold percentage of the servers 110A-110D consenting.

Figure 3A:
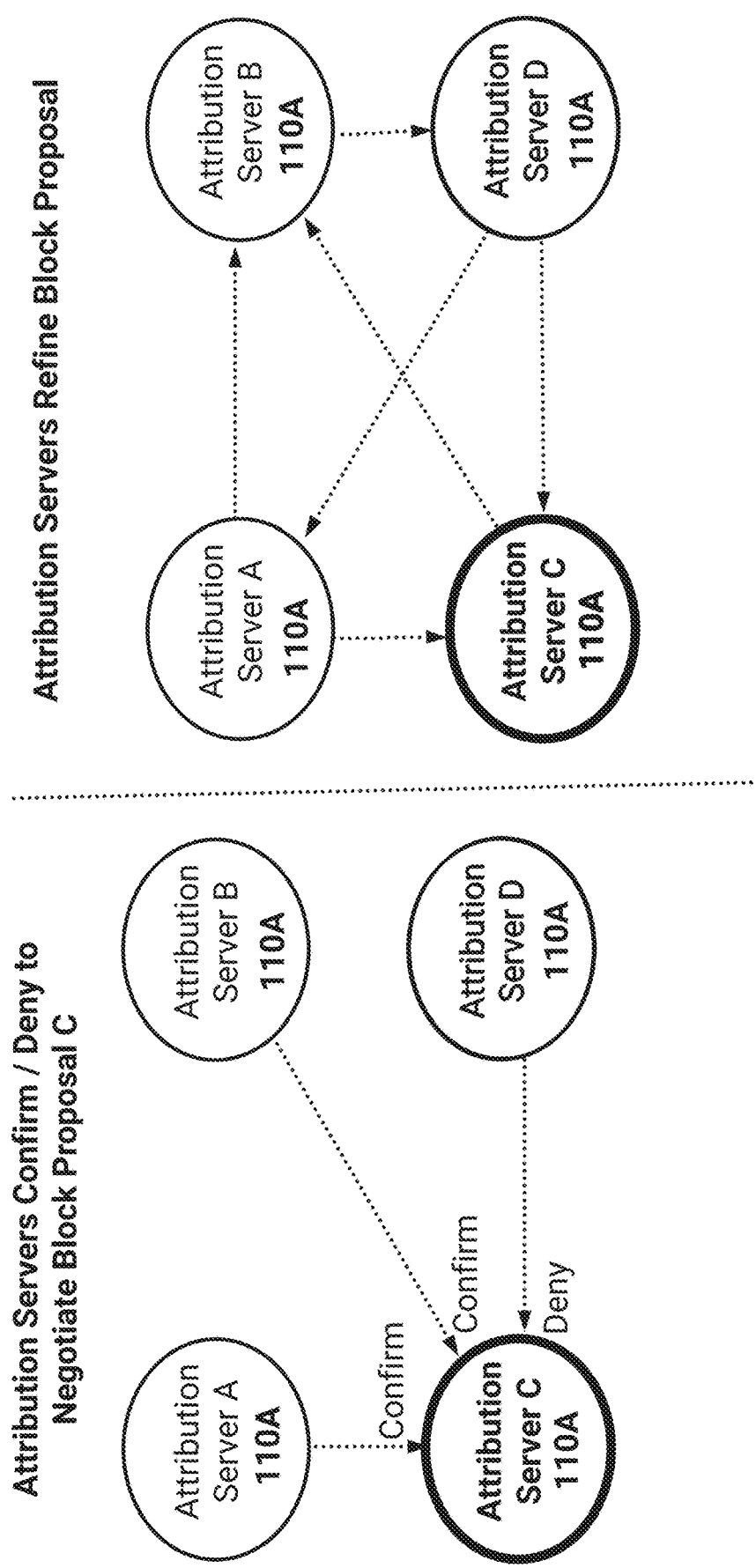
FIG. 3A illustrates a block diagram of attribution servers refining a block proposal according to the consensus protocol described herein.

FIG. 3A illustrates a block diagram of attribution servers 110A-110D refining a block proposal according to the consensus protocol described herein. As described above, the attribution servers may vote to refine the block proposal 204 provided by attribution server C. For example, the attribution servers may route messages to each other indicating consent or denial to refining the block proposal 204. The refinement step described herein may therefore occur upon the attribution servers 110A-110D successfully voting to include block proposal 204. Additionally, the refinement step may also occur upon the attribution servers 110A-110D voting to reject the block proposal 204, and voting to cause refinement of the incremental values included in the block proposal 204.

As illustrated in FIG. 3A, the attribution servers 110A-110D have voted to refine the block proposal 204 described in FIG. 2B. Each attribution server can indicate their preferred refinements to the incremental values included in block proposal 204. For example, attribution server A 110A may indicate that its incremental value is to be adjusted upwards while another attribution server B 110B is to be adjusted a same amount downwards. Thus, the total incremental values included in the block proposal 204 may remain the same and the attribution servers may negotiate over the specific incremental values.

Optionally, an attribution server may only cause adjustment to their incremental value and indicate another attribution server for which the credit or debit adjusted amount is to be assigned. For example, attribution server A 110A can indicate that its incremental value is to be adjusted upward by 0.02, and can therefore indicate that attribution server B 110B is to be debited by 0.02. Optionally, the attribution servers may be limited to a number of proposed refinements. For example, attribution server A may be limited to providing 3, 5, and so on refinements to the block proposal 204.

Additionally, an extent to which incremental values may be adjusted can be constrained. For example, an incremental value may be adjusted by less than a threshold percent of its value in block proposal 204. However, since a first incremental value may be substantially less than a second incremental value in block proposal 204, the first incremental value may have less room for adjustment than the second incremental value. In this case, optionally any incremental value may be adjusted by up to a threshold percentage of a maximum incremental value in the block proposal 204 or up to a threshold percentage of the total incremental value. For example, the first incremental value may be adjusted upward by an amount equal to 10% of the second incremental value.

The attribution servers 110A-110D may thus provide refinements and vote on whether the refinements are consented upon. As will be described below, the attribution servers 110A-110D may indicate consent optionally by precommitting a block that includes the refinements. Precommitting a block may include attaching the block to their respective blockchains. The attribution servers 110A-110D may identify whether the other attribution servers 110A-110D have precommited a same block, and upon determining that a threshold number have may cause the block to be included in the blockchain network 2. As an example, the attribution servers 110A-110D may utilize an application programming interface (API) call associated with the blockchain network 2 to request precommited blocks from the other servers 110A-110D.

Figure 3B:
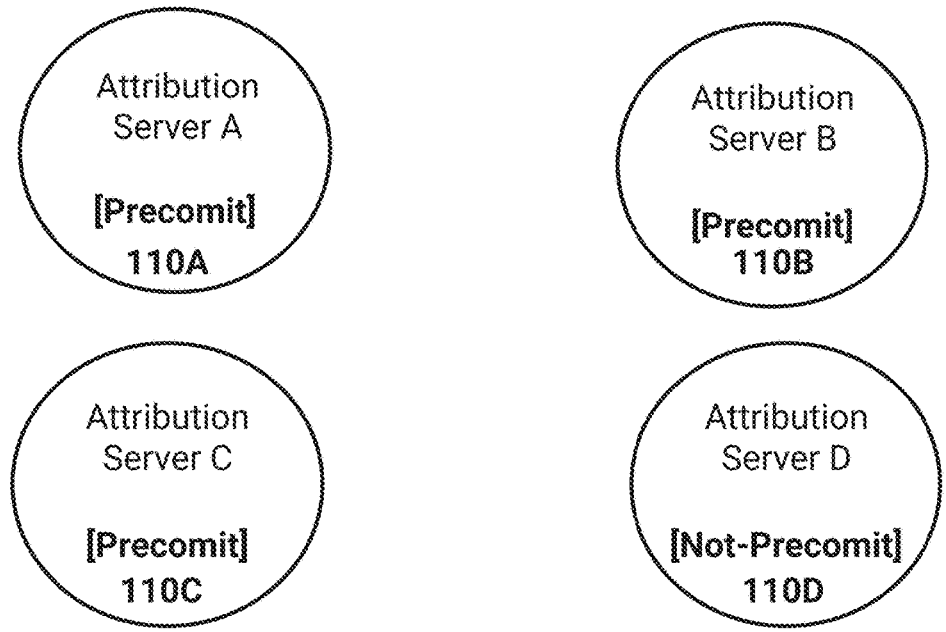
FIG. 3B illustrates an example block diagram of attribution servers evaluating the refined block proposal according to the consensus protocol described herein.
Figure 3B:
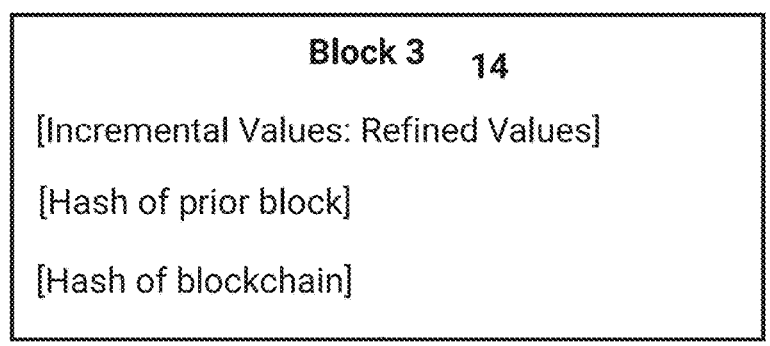

FIG. 3B illustrates an example block diagram of attribution servers 110A-110D evaluating the refined block proposal according to the consensus protocol described herein. As described above, with respect to FIG. 3A, the attribution servers 110A-110D may cause refinement of a block proposal. In the example of FIG. 3A, the attribution servers 110A-110D are illustrated as precommitting a refined block proposal. For example, attribution servers 110A-110C have precommited the refined block proposal, while attribution server 110D has not precommited.

Since greater than a threshold percentage of the attribution servers 110A-110D have precommited the refined block proposal (e.g., greater than ⅔, ¾, and so on), the refined block 14 is included in the blockchain network 2. Similar to the description of FIG. 2B, the block 14 may be included in the blockchain network 2 and the refined incremental values thus stored.

Figure 3C:
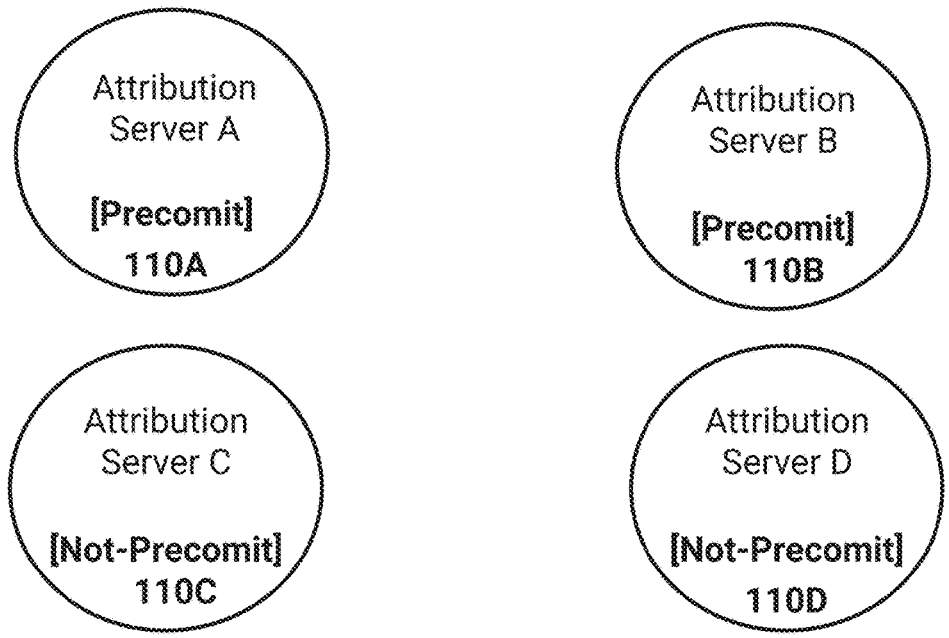
FIG. 3C illustrates another example block diagram of attribution servers evaluating the refined block proposal according to the consensus protocol described herein.
Figure 3C:
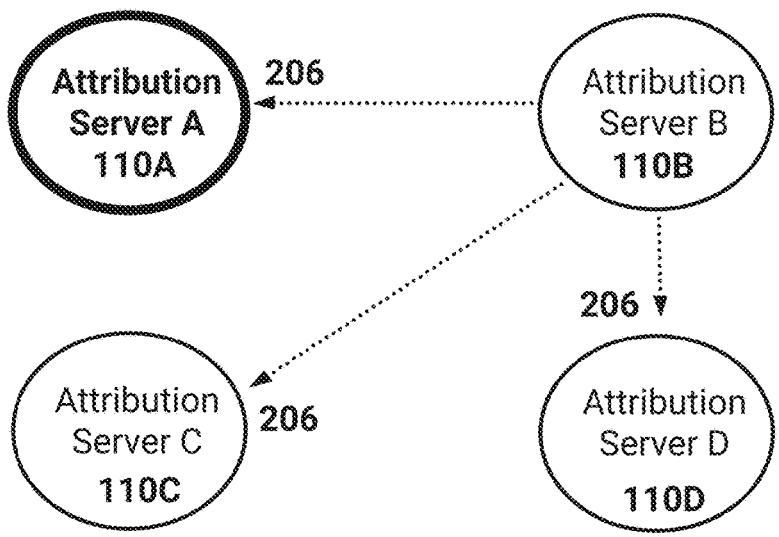

FIG. 3C illustrates another example block diagram of attribution servers 110A-110D evaluating the refined block proposal according to the consensus protocol described herein. In contrast to FIG. 3B, less than a threshold percentage of attribution servers 110A-110D have indicated consent to the refined block. For example, the attribution servers 110A-110D can evaluate multitudes of refined incremental values, and can decide that no consensus can be reached. In this example, a next attribution server 110A may provide its block proposal 206 for evaluation. For example, the block proposal 206 may be voted on as described in FIGS. 2A-2B, and potentially refined as described in FIGS. 3A-3B.

Example Flowcharts

Figure 4:
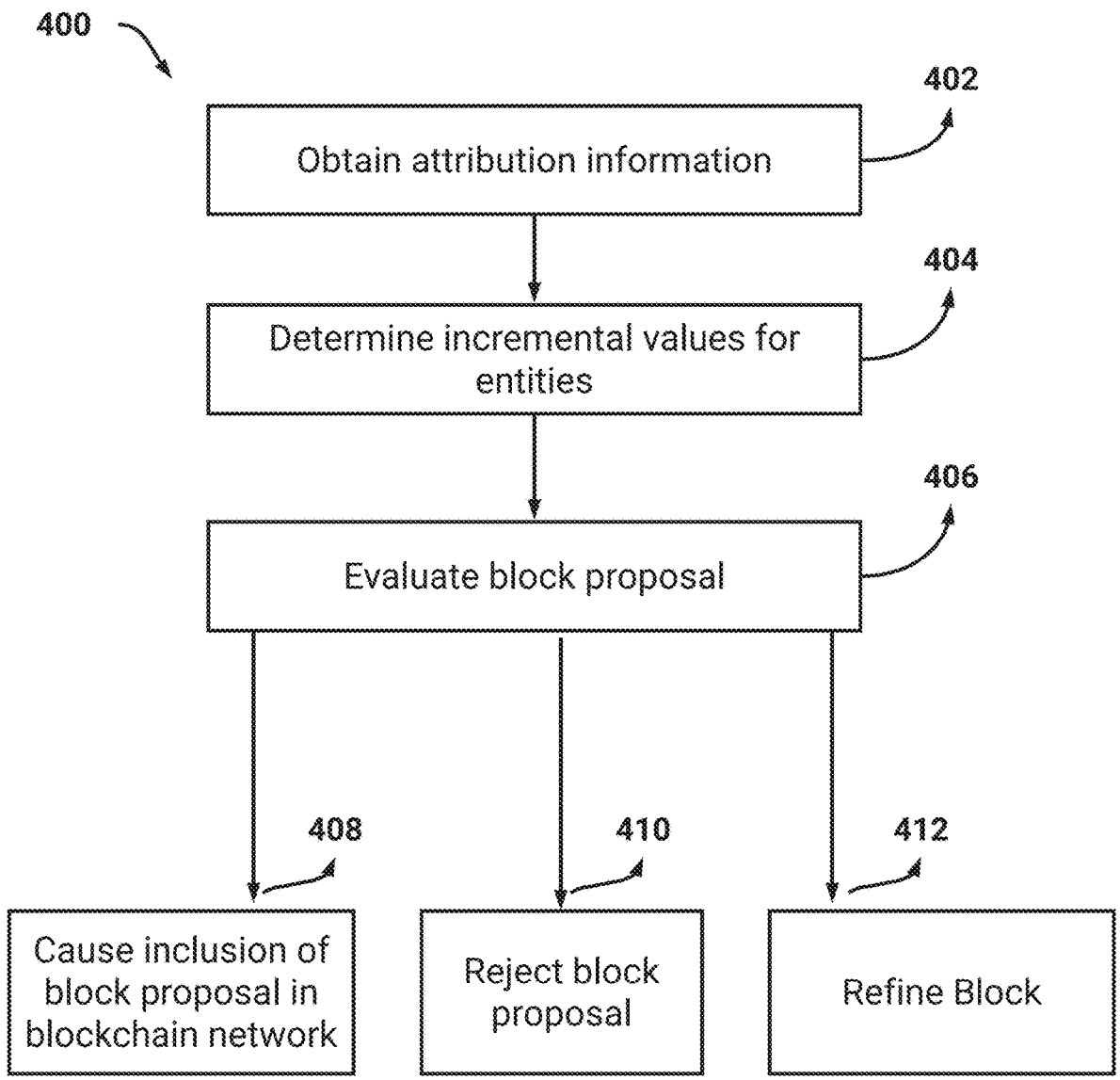
FIG. 4 illustrates a flowchart of an example process for including a new block in a blockchain according to a consensus protocol.

FIG. 4 illustrates a flowchart of an example process 400 for including a new block in a blockchain according to a consensus protocol. For convenience, the protocol will be described as being performed by a system of one or more computers, for example an entity (e.g., attribution server 110A).

At block 402, the system obtains attribution information. As described in FIG. 1A, the attribution information may relate to a particular event. Example events may include conversions, such as a user purchasing a product on an electronic marketplace, a user signing up for a particular user account, a machine learning model classifying an image, and so on. The attribution information may include any entity's (e.g., attribution servers) interactions with the user, including presentation of content, monitoring of user interactions with web pages or computer systems, and so on. Additionally, the attribution information may include information generated by a particular system (e.g., the attribution consensus server 100) describing a user's journey towards the particular event. The information may be based on one or more machine learning models that predict likely behavior of the user that may not existent in the attribution information. For example, the user may be determined to have visited a particular blog associated with an entity, based on the user's prior browsing history or based on a threshold number of users visiting the blog prior to occurrence of the particular event.

Optionally, the system may utilize attribution information only known to the system. For example, the system may have presented content to the user. This presentation may be unknown to the particular system (e.g., attribution consensus system 100). As described above, the particular system may have access to the ingress points of the user to the particular system. As an example, a cookie may provide information to the particular system indicating that the user visited a particular web page. However, the particular system may not be aware of other web pages visited by the user. Additionally, the particular system may not be aware of specific actions taken by the user on web pages. In contrast, the system may have provided these other web pages to the user, and/or may have monitored user interactions of the user on these other web pages. Thus, the system may obtain its own attribution information. This attribution information may then be utilized to determine incremental values (e.g., in addition to the attribution information obtained from the particular system).

At block 404, the system determines incremental values for entities. As described above, the system can determine a block proposal that indicates incremental values for the entities included in a blockchain network. The system may determine the incremental values according to a preferred scheme, such as last-touch and so on as described above. The block proposal may be transmitted to the remaining entities for evaluation. As described above, the system may be selected to initially broadcast its determined incremental values. Alternatively, the system may be selected upon one or more prior block proposals being evaluated and rejected by the entities (e.g., less than a threshold percentage or numbers of entities may have approved the block proposals).

At block 406, the system evaluates a block proposal. The system can receive a block proposal (e.g., from another entity) and determine whether to accept the proposal. The system may generate a message for broadcast over the blockchain network indicating whether the block proposal is accepted or denied. The system may optionally route the message through an outside system (e.g., the attribution consensus system 100) or directly to the remaining entities. As described above, each system may optionally have access to its own attribution information which is not shared with other entities. Thus, the system may optionally request access to the other entity's unique attribution information. In this way, the system may determine that the incremental values are reasonable in view of this unique information.

At block 408, the system causes inclusion of the block proposal in the blockchain. The system may precommit the block, indicating acceptance of the block proposal. For example, the system may add the block to its internal blockchain and broadcast the acceptance of the block or broadcast its updated blocks (e.g., the updated blocks may reflect the inclusion of the block proposal). If greater than a threshold percentage of the entities accept the block proposal, a block will be included in the blockchain reflecting the accepted block proposal.

At block 410, the system rejects the block proposal. The system may evaluate the block proposal, and determine that the incremental values are unacceptable. The system may then broadcast its rejection of the block proposal to the remaining entities.

At block 412, the system refines the block proposal. Optionally, if greater than a threshold percentage of entitles accept the block proposal then the accepted block may be refined by the entities. For example, the entities may negotiate to adjust the incremental values. As described above, the entities may be limited in an extent to which the incremental values may be adjusted. Optionally, if the block proposal is rejected the entities may vote to refine the rejected block proposal. For example, if greater than a threshold percentage of entities vote to refine the block proposal, the entities may negotiate to adjust the incremental values. If the refined block proposal is accepted by a threshold percentage of entities, the refined block may be included in the block chain.

Figure 5:
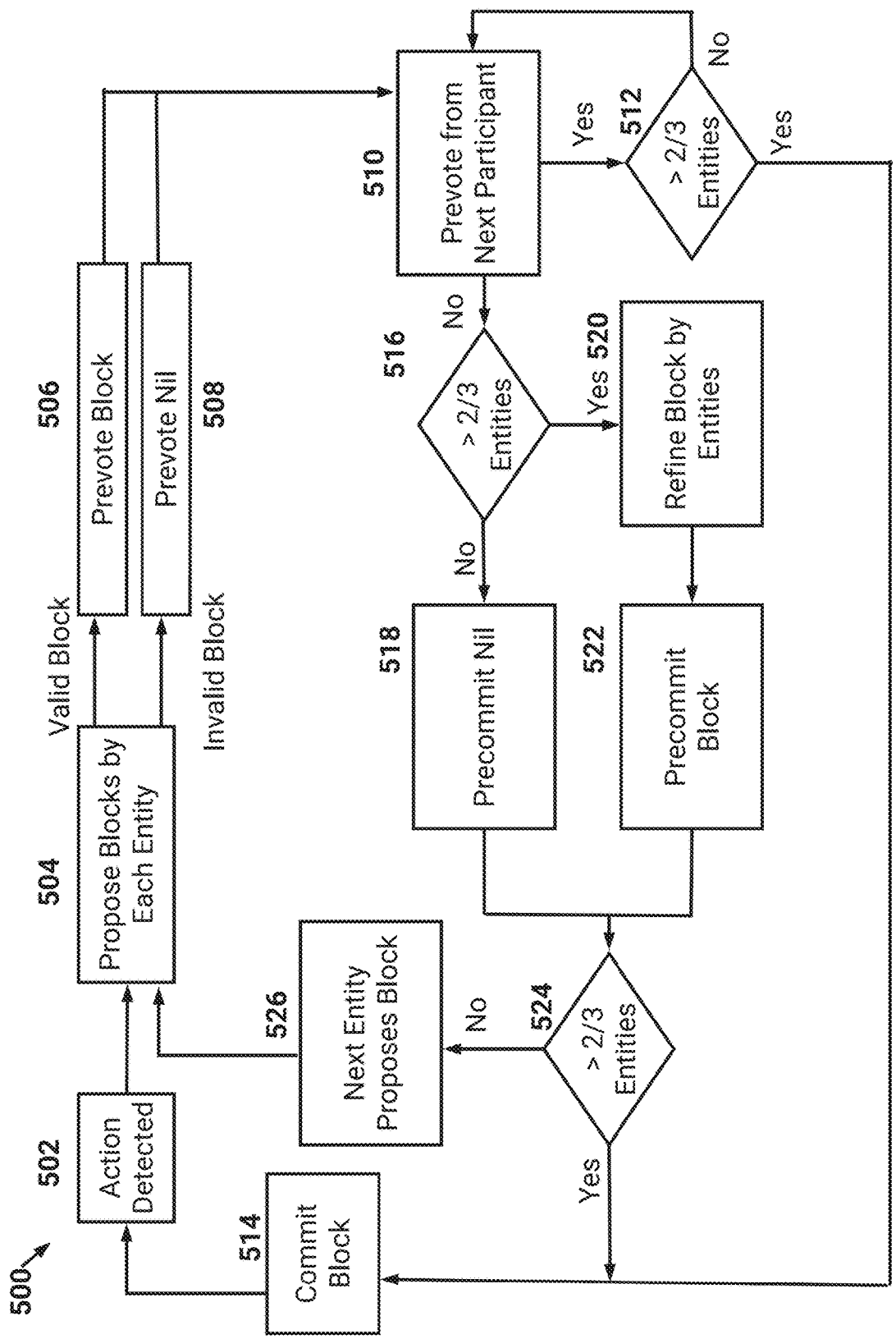
FIG. 5 illustrates a flowchart of another example process for including a new block in a blockchain according to a consensus protocol.

FIG. 5 illustrates a flowchart of another example process 500 for including a new block in a blockchain according to a consensus protocol. FIG. 5 describes an example embodiment of interactions between entities associated with a blockchain network and an outside system (e.g., the attribution consensus system 100).

At block 502, an action is detected that triggers generation of block proposals. At block 504, the entities generate block proposals that include incremental values assignable to each of the entities. The entities may receive attribution information from the outside system, and generate the incremental values based, at least in part, on the attribution information (e.g., the entities may optionally have information unique to them). At block 506, a block proposal is selected that is valid. For example, a valid block proposal may include a block proposal that has not yet been rejected. At block 508, an invalid block proposal may be rejected (e.g., the block proposal may already be rejected by the entities may optionally be indicated as being rejected so that it's not included in the blockchain).

At block 510, the entities vote on whether to approve or deny the block proposal. At block 512, if greater than ⅔ of the entities approve the block proposal, then at block 514 the block proposal is committed into the blockchain. At block 516, if less than ⅔ of the entities approve the block proposal, then any entity voting against the block proposal can commit the block as being void (e.g., precommit nil). Optionally, if greater than ⅔ of the entities vote to refine the proposed block, then at block 520 the entities can refine the proposed block. As described above, the entities may negotiate to adjust the incremental values included in the block proposal.

At block 522, any entity that approves of a refined block proposal may precommit the block. At block 524, if greater than ⅔ of the entities have precommitted a same block proposal (e.g., a refined block proposal), then the block proposal is committed at block 514. If less than ⅔ of the entities have approved a same block proposal, then a next entity's block proposal is selected at block 526.

Figure 6:
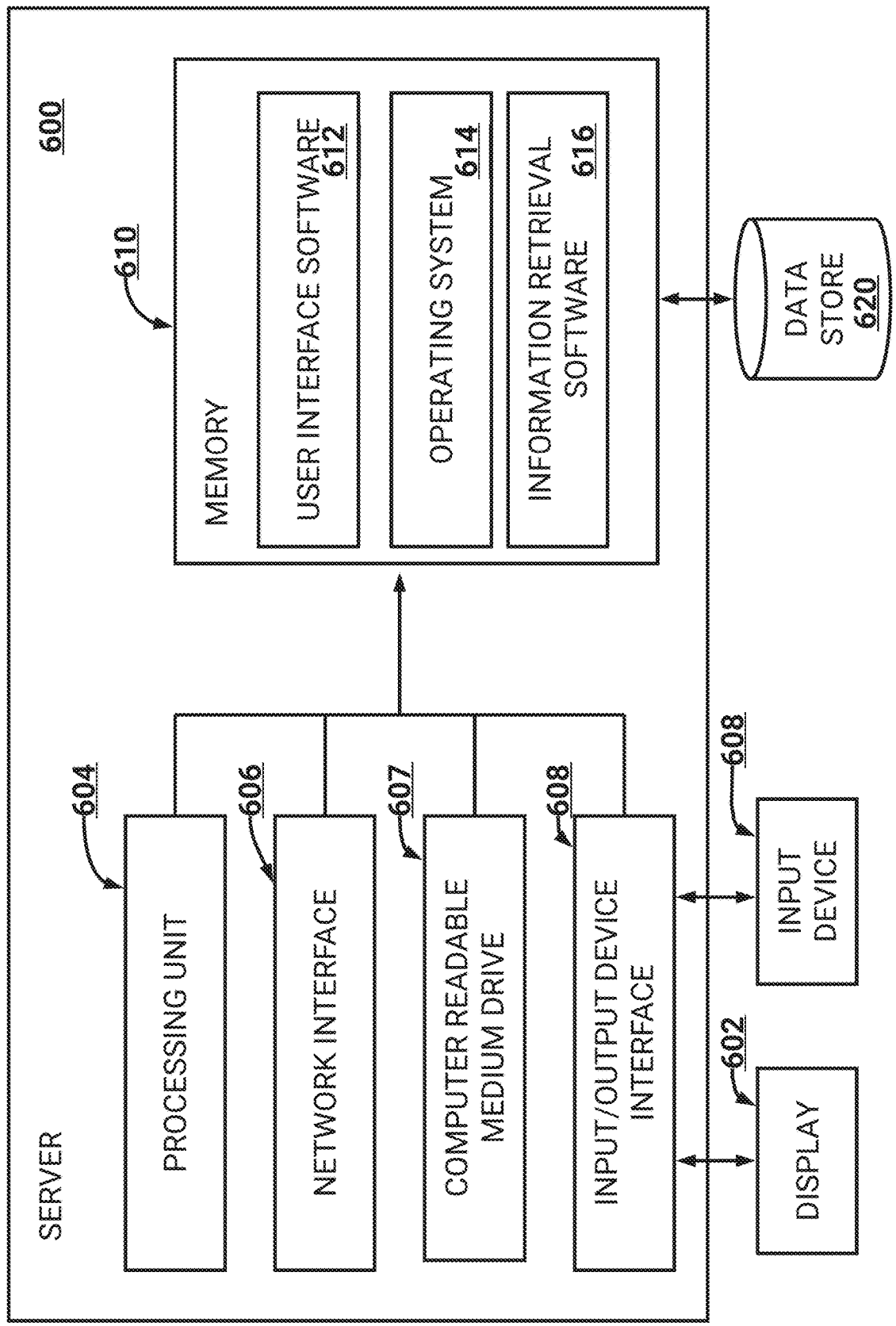
FIG. 6 is a block diagram depicting an illustrative configuration of one embodiment of a server than may implement elements of an attribution server and/or the attribution consensus system of FIGS. 1A-1B.

FIG. 6 is a block diagram depicting an illustrative configuration of one embodiment of a server 600 than may implement elements of an attribution server (e.g., attribution server 110A) and/or the attribution consensus system 100 of FIGS. 1A-1B. The general architecture of server 600 depicted in FIG. 6 includes an arrangement of computer hardware and software components that may be used to implement aspects of the present disclosure. As illustrated, the server 600 includes a processing unit 604, a network interface 606, a computer readable medium drive 607, an input/output device interface 620, a display 602, and an input device 624, all of which may communicate with one another by way of a communication bus. The network interface 606 may provide connectivity to one or more networks or computing systems, such as to one or more clients, indexing systems, data storage systems (e.g., attribution database 104), and so on. The processing unit 604 may thus receive information and instructions from other computing systems or services via a network. The processing unit 604 may also communicate to and from memory 610 and further provide output information for an optional display 602 via the input/output device interface 620. The input/output device interface 620 may also accept input from the optional input device 624, such as a keyboard, mouse, digital pen, etc. In some embodiments, the server 600 may include more (or fewer) components than those shown in FIG. 6. For example, some embodiments of the server 600 may omit the display 602 and input device 624, while providing input/output capabilities through one or more alternative communication channel (e.g., via the network interface 606).

The memory 610 may include computer program instructions that the processing unit 604 executes in order to implement one or more embodiments. The memory 610 generally includes RAM, ROM, and/or other persistent or non-transitory memory. The memory 610 may store an operating system 614 that provides computer program instructions for use by the processing unit 604 in the general administration and operation of the server 600. The memory 610 may further include computer program instructions and other information for implementing aspects of the present disclosure. For example, in one embodiment, the memory 610 includes user interface software 612 that generates user interfaces (and/or instructions therefor) for display upon a computing device, e.g., via a navigation interface such as a web browser installed on the computing device. In addition, memory 610 may include or communicate with one or more auxiliary data stores, such as data store 620, which may correspond to any persistent or substantially persistent data storage, such as a hard drive (HDD), a solid-state drive (SDD), network attached storage (NAS), a tape drive, or any combination thereof.

In addition to the user interface module 612, the memory 610 may include information retrieval software 616 that may be executed by the processing unit 604. In one embodiment, the information retrieval software 616 implements various aspects of the present disclosure. For example, generating and providing attribution information to attribution servers. As another example, determining incremental values and utilizing an incremental consensus protocol for a blockchain network. While the information retrieval software 616 is shown in FIG. 6 as part of the server 600, in other embodiments, all or a portion of the software may be implemented by alternative computing devices, such as virtual computing devices within a hosted computing environment.

Optionally particular techniques described herein may be embodied in a method implemented by a plurality of entities, the entities utilizing a same blockchain network associated with an incremental consensus protocol, wherein the incremental consensus protocol: causes selection of an entity of the plurality of entities, the selected entity broadcasting a first block proposal to be evaluated for inclusion in the blockchain network, wherein the entities generate respective block proposals comprising information determined by the entities; routes responses from the entities regarding approval or denial of the first block proposal; in response to a first threshold percentage of the entities denying the first block proposal, causes incremental selection of subsequent entities, and incrementally broadcasts block proposals associated with the subsequent entities, wherein based on the first threshold percentage of the entities denying each block proposal associated with the subsequent entity, the consensus protocol identifies a second threshold number of the block proposals generated by the entities, and causes incremental evaluation of the second threshold number of block proposal.

The entity may be selected based on a measure of network traffic associated with the entity. Incremental selection of subsequent entities may comprise causing selection of a second entity subsequent to the entity, and routing a second block proposal generated by the second entity to remaining entities for evaluation; and in response to a first threshold percentage of the entities denying the second block proposal, causing selection of a third entity subsequent to the second entity and routing a third block proposal generated by the third entity to remaining entities for evaluation. The routed responses may comprise information indicating whether the entities precommitted the first block proposal. Identifying the second threshold number of block proposals may be based on a number of responses indicating approval. A particular block proposal included in the second threshold number of block proposals may be evaluated, and wherein in response to greater than the first threshold percentage of entities approving the particular block proposal, inclusion of the particular block proposal into the blockchain network may be caused.

Each of the processes, methods, and algorithms described in the preceding sections may be embodied in, and fully or partially automated by, code modules executed by one or more computer systems or computer processors comprising computer hardware. The code modules (or "engines") may be stored on any type of, one or more, non-transitory computer-readable media (e.g., a computer storage product) or computer storage devices, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module," as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as compact discs, digital video discs, flash drives, or any other tangible media. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smart phone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop-down menu, a tool bar, a pop-up menu, interactive voice response system, or otherwise.

The various features and processes described herein may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y or Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y or at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated herein, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A method implemented by an entity of a plurality of entities associated with a blockchain network utilizing an incremental consensus protocol, the method comprising:
by an attribution server of one or more computers,
obtaining, from a system, information indicating an occurrence of a particular event involving a user, the particular event causing generation, by the entities, of respective block proposals for inclusion in the blockchain network, wherein the event comprises a completed purchase of an item by the user;
accessing information describing interactions between the user and individual entities of the plurality of entities, wherein the information describing the interactions includes (a) a first indication that a first entity of the plurality of entities caused presentation of first content to the user regarding the item prior to the completed purchase of the item by the user, and (b) a second indication that a second entity of the plurality of entities caused presentation of second content to the user regarding the item prior to the completed purchase of the item by the user;
determining, based at least in part on the first indication and the second indication, a first degree to which the first entity caused the particular event involving the user to occur as a result of the first entity causing the first content to be presented to the user prior to the completed purchase;
determining, based at least in part on the first indication and the second indication, a second degree to which the second entity caused the particular event involving the user to occur as a result of the second entity causing the second content to be presented to the user prior to the completed purchase;
generating a block proposal including incremental values that each represent a respective degree to which an individual entity of the plurality of entities caused the particular event involving the user to occur wherein the incremental values include (a) the first degree determined for the first entity and (b) the second degree determined for the second entity;
obtaining information indicating evaluation of the block proposal by remaining entities of the plurality of entities, wherein the evaluation by an individual remaining entity indicates whether the individual remaining entity accepts the incremental values of the block proposal;
based on the information indicating evaluation of the block proposal by the remaining entities, determining that greater than a threshold percentage of the plurality of entities approve the block proposal; and
in response to the determining that greater than the threshold percentage of the plurality of entities approve the block proposal, causing, at least in part, inclusion of the block proposal in the blockchain network.

2. The method of claim 1, wherein obtaining information indicating occurrence of a particular event is based on a smart contract being triggered.

3. The method of claim 1, further comprising:
broadcasting, by the entity and to remaining entities of the plurality of entities, the block proposal via the blockchain network.

4. The method of claim 1, wherein obtaining information indicating evaluation of the block proposal comprises:
receiving information indicating that the entity is selected for initial evaluation of the block proposal; and
obtaining information from each remaining entity indicating whether the block proposal is approved or denied.

5. The method of claim 1, wherein causing inclusion of the block proposal comprises:
precommitting, by the entity, the block proposal, wherein precommitting the block proposal comprises adding the block proposal to a version of a blockchain of the blockchain network maintained by the entity; and
obtaining information indicating that the threshold percentage of the plurality of entities precommitted the block proposal, the information being broadcast by the entities.

6. The method of claim 1, wherein causing inclusion of the block proposal comprises:
enabling adjustment, by individual entities, of incremental values included in the block proposal, wherein the entities are configured to broadcast respective refined block proposals which include adjusted incremental values; and
in response to the threshold percentage of the plurality of entities approving a particular refined block proposal, causing inclusion of the refined block proposal in the blockchain network.

7. The method of claim 1, wherein in response to less than a threshold percentage of the plurality of entities approving a particular block proposal, the method comprises:
causing selection of a different entity of the plurality of entities; and
evaluating a different block proposal associated with the different entity.

8. The method of claim 1, wherein the information describing interactions between the user and the individual entities reflects activity from within a threshold time period.

9. The method of claim 1, further comprising:
prior to the obtaining information indicating the evaluation of the block proposal by the remaining entities, routing the block proposal to the remaining entities.

10. A system associated with an entity of a plurality of entities, the system comprising one or more computers and computer storage media storing instructions that, when executed by the system, cause the system to perform operations comprising:
obtaining, from a particular system, information indicating an occurrence of a particular event involving a user, the particular event causing generation, by the plurality of entities, of respective block proposals for inclusion in a blockchain network, wherein the event comprises a completed purchase of an item by the user;
accessing information describing interactions between the user and individual entities of the plurality of entities, wherein the information describing the interactions includes (a) a first indication that a first entity of the plurality of entities caused presentation of first content to the user regarding the item prior to the completed purchase of the item by the user, and (b) a second indication that a second entity of the plurality of entities caused presentation of second content to the user regarding the item prior to the completed purchase of the item by the user;
determining, based at least in part on the first indication and the second indication, a first degree to which the first entity caused the particular event involving the user to occur as a result of the first entity causing the first content to be presented to the user prior to the completed purchase;

determining, based at least in part on the first indication and the second indication, a second degree to which the second entity caused the particular event involving the user to occur as a result of the second entity causing the second content to be presented to the user prior to the completed purchase;

generating a block proposal including incremental values that each represent a respective degree to which an individual entity of the plurality of entities caused the particular event involving the user to occur wherein the incremental values include (a) the first degree determined for the first entity and (b) the second degree determined for the second entity;

obtaining information indicating evaluation of the block proposal by remaining entities of the plurality of entities, wherein the evaluation by an individual remaining entity indicates whether the individual remaining entity accepts the incremental values of the block proposal; and in response to greater than a threshold percentage of the plurality of entities approving the block proposal, causing, at least in part, inclusion of the block proposal in the blockchain network.

11. The system of claim 10, wherein the system executes software associated with a node of the blockchain network.

12. The system of claim 10, wherein the instructions further cause the system to perform additional operations comprising:

broadcasting, to remaining entities of the plurality of entities, the block proposal via the blockchain network.

13. The system of claim 10, wherein obtaining information indicating evaluation of the block proposal comprises:

receiving information indicating that the entity is selected for initial evaluation of the block proposal; and obtaining information from each remaining entity indicating whether the block proposal is approved or denied.

14. The system of claim 10, wherein causing inclusion of the block proposal comprises:

precommitting the block proposal, wherein precommitting the block proposal comprises adding the block proposal to a version of a blockchain of the blockchain network maintained by the entity; and obtaining information indicating that the threshold percentage of the plurality of entities precommitted the block proposal, the information being broadcast by the entities.

15. The system of claim 10, wherein causing inclusion of the block proposal comprises:

enabling adjustment, by the entities, of incremental values included in the block proposal, wherein the entities are configured to broadcast respective refined block proposals which include adjusted incremental values; and in response to the threshold percentage of the plurality of entities approving a particular refined block proposal, causing inclusion of the refined block proposal in the blockchain network.

16. The system of claim 10, wherein in response to less than a threshold percentage of the plurality of entities approving the block proposal, the instructions further cause the system to perform additional operations comprising:

causing selection of a different entity of the plurality of entities; and evaluating a different block proposal associated with the different entity.

* * * * *